US008509292B2

(12) United States Patent
Lee et al.

(10) Patent No.: US 8,509,292 B2
(45) Date of Patent: Aug. 13, 2013

(54) RECEIVER CAPABLE OF COMPENSATING FOR MISMATCH OF I SIGNAL AND Q SIGNAL AND COMMUNICATION SYSTEM INCLUDING THE SAME

(75) Inventors: Kyu Man Lee, Suwon-si (KR); Jin Yong Chung, Seoul (KR); Gi Bong Jeong, Seoul (KR)

(73) Assignee: Samsung Electronics Co. Ltd., Suwon-Si (KR)

( * ) Notice: Subject to any disclaimer, the term of this patent is extended or adjusted under 35 U.S.C. 154(b) by 920 days.

(21) Appl. No.: 12/612,266

(22) Filed: Nov. 4, 2009

(65) Prior Publication Data
US 2010/0111230 A1 May 6, 2010

(30) Foreign Application Priority Data

Nov. 5, 2008 (KR) .................. 10-2008-0109502

(51) Int. Cl.
*H04B 1/38* (2006.01)
*H04L 5/16* (2006.01)

(52) U.S. Cl.
USPC ............ 375/222; 375/349; 375/350; 455/126

(58) Field of Classification Search
USPC .................. 375/222, 349–350; 455/126
See application file for complete search history.

(56) References Cited

U.S. PATENT DOCUMENTS

| 7,187,916 | B2 | 3/2007 | Mo et al. | |
| 2005/0208895 | A1* | 9/2005 | Busson et al. | 455/59 |
| 2006/0109893 | A1 | 5/2006 | Chen et al. | |
| 2007/0099570 | A1* | 5/2007 | Gao et al. | 455/63.1 |
| 2007/0104291 | A1* | 5/2007 | Yoon | 375/324 |

FOREIGN PATENT DOCUMENTS

| JP | 2004-173281 | 6/2004 |
| KR | 1020050116138 | 9/2005 |

* cited by examiner

*Primary Examiner* — Curtis Odom
(74) *Attorney, Agent, or Firm* — F. Chau & Associates, LLC (57) ABSTRACT

A receiver includes a frequency converter configured to generate a I signal and a Q signal from each band of a multiband signal and a mismatch compensator configured to estimate a mismatch of the I signal and the Q signal for each of the bands of the multiband signal and store at least one compensation value to compensate for the estimated mismatch. The frequency converter compensates for the mismatch of the I signal and the Q signal based on the at least one compensation value.

19 Claims, 7 Drawing Sheets

RECEIVER CAPABLE OF COMPENSATING FOR MISMATCH OF I SIGNAL AND Q SIGNAL AND COMMUNICATION SYSTEM INCLUDING THE SAME

CROSS-REFERENCE TO RELATED APPLICATIONS

This application claims priority under 35 U.S.C. §119 to Korean Patent Application No. 10-2008-0109502, filed on Nov. 5, 2008, in the Korean Intellectual Property Office, the disclosure of which is incorporated by reference in its entirety herein.

BACKGROUND

1. Technical Field

Exemplary embodiments of the present inventive concept relate to a receiver, and more particularly, to a receiver capable of compensating for the mismatch of an in-phase (I) signal and a quadrature-phase (Q) signal, and a communication system including the same.

2. Discussion of Related Art

A zero-IF structure or an image-rejection structure, which may be used as a receiver structure, may generate an I signal and a Q signal. The receiver attempts to generate I and Q signals having a 90-degree phase difference therebetween. However, the I and Q signals generated by the receiver may not have an exact 90-degree phase difference therebetween due to various influences. For example, a physical defect in the receiver caused during the manufacturing process, and variations of the supply voltage or temperature of the receiver may result in a phase difference that varies from the target phase difference. As a result, a signal-to-noise ratio (SNR) decreases, and therefore, sensitivity of the receiver may also decrease. Further, a receiver that has a hopping signal in a multi-band frequency may deteriorate in performance because of the mismatch of the I and Q signals, which may be different in different bands.

Thus, there is a need for a receiver that can compensate for a mismatch between I and Q signal and a communication system including the same.

SUMMARY

According to an exemplary embodiment of the present inventive concept, a receiver including a frequency converter configured to generate an I signal and a Q signal from each band of a multiband signal and a mismatch compensator configured to estimate a mismatch of the I signal and the Q signal for each of the bands of the multiband signal and store at least one compensation value to compensate for the estimated mismatch. The frequency converter compensates for the mismatch of the I signal and the Q signal based on the at least one compensation value.

The receiver may further include an analog-to-digital converter configured to perform analog-to-digital conversion of the I signal and the Q signal to output a digital I signal and a digital Q signal and a demodulator configured to receive the digital I signal and the digital Q signal and to perform demodulation of each of the digital I and Q signals. The mismatch compensator may estimate a mismatch of a digital I signal and a digital Q signal, which are generated during an operation of the demodulator, for each of the bands and store at least one digital compensation value to compensate for the estimated mismatch. The demodulator may compensate for the mismatch of the digital I signal and the digital Q signal based on the at least one digital compensation value output from the mismatch compensator and perform the demodulation based on a result of the compensation.

The at least one compensation value or the at least one digital compensation value may be one of a phase mismatch compensation value and a magnitude mismatch compensation value.

The mismatch compensator may estimate a mismatch between the digital I signal and the digital Q signal that have undergone a fast Fourier transform (FFT) and store the at least one digital compensation value to compensate for the estimated mismatch.

The demodulator may include a first mixer configured to receive the digital I signal and the digital Q signal and perform mixing of the digital I signal and mixing of the digital Q signal based on the at least one digital compensation value, an FFT block configured to perform FFT of signals output from the first mixer, an equalizer configured to perform equalization of each of the FFT signals output from the FFT block, and a decoder configured to decode equalized signals output from the equalizer.

The demodulator may further include a second mixer electrically connected between the FFT block and the equalizer to perform mixing of each of the FFT signals output from the FFT block based on the at least one digital compensation value.

The demodulator may further include a selector configured to selectively transmit the signals output from the first mixer or signals output from the second mixer to the mismatch compensator. The mismatch compensator may estimate a mismatch of the signals output from the first compensator or the signals output from the second compensator and store the at least one digital compensation value based on a result of the estimation.

The mismatch compensator may include a mismatch estimator configured to estimate the mismatch of the I signal and the Q signal and to generate the at least one compensation value to compensate for the estimated mismatch and a compensation value storage unit configured to store the at least one compensation value, generated by the mismatch estimator, for each of the bands.

The frequency converter may read at least one compensation value corresponding to each band of the multiband signal from the compensation value storage unit and compensate for the mismatch of the I signal and the Q signal based on the at least one compensation value. The receiver may be implemented in a communication system.

A receiver according to an exemplary embodiment of the present invention includes an antenna, a low band pass filter, a low-noise amplifier, a voltage-controlled oscillator, a signal generator, a first mixer, a second mixer, a third mixer, a fourth mixer, a fifth mixer, a sixth mixer, an analog to digital converter, logic to compute a Fast Fourier Transform (FFT), and a mismatch compensation unit. The antenna is configured to receive a multiband signal having at least two distinct frequency bands. The low band pass filter is configured to reject frequencies from at least one of the two distinct frequency bands to generate a band passed signal. The low-noise amplifier is configured to amplify the band passed signal to generate an output signal. The voltage-controlled oscillator is configured to generate a reference signal. The signal generator is configured to generate an in-phase signal and a quadrature-phase signal in response to the reference signal. The first mixer is configured to mix the output signal, the in-phase signal, and a first compensation value to generate a compensated in-phase signal. The second mixer is configured to mix the output signal, the quadrature-phase signal, and a second compensation value to generate a compensated quadrature-phase signal. The analog to digital converter is configured to generate a digital in-phase signal from the compensated in-phase signal and a digital quadrature-phase signal from the compensated quadrature-phase signal. The third mixer is configured to mix the digital in-phase signal with a third compensation value to generate a compensated digital in-phase signal. The fourth mixer is configured to mix the digital quadrature-phase signal with a fourth compensation value to generate a compensated digital quadrature-phase signal. The logic computes a FFT on the compensated digital in-phase signal and the compensated digital quadrature-phase signal to respectively generate a corresponding FFT digital in-phase signal and a FFT digital quadrature-phase signal. The fifth mixer is configured to mix the FFT digital in-phase signal with the third compensation value to generate a compensated FFT digital in-phase signal. The sixth mixer is configured to mix the FFT digital quadrature-phase signal with the fourth compensation value to generate a compensated FFT digital quadrature-phase signal. The mismatch compensation unit is configured to estimate a mismatch in magnitude and phase between the compensated digital in-phase signal and the compensated digital quadrature-phase signal and a mismatch in magnitude and phase between the compensated FFT digital in-phase signal and the compensated FFT digital quadrature-phase signal to generate all of the compensation values.

A communication system according to an exemplary embodiment of the present invention includes a receiver configured to compensate for a mismatch between an in-phase (I) signal and a quadrature-phase (Q) signal. The receiver includes an antenna, a voltage-controlled oscillator, a signal generator, a first mixer, a second mixer, and a mismatch compensation unit. The antenna is configured to receive a multiband signal. The voltage-controlled oscillator is configured to generate a reference signal. The signal generator is configured to generate an in-phase signal and a quadrature-phase signal in response to the reference signal. The first mixer is configured to mix the multiband signal, the I signal, and a first compensation value to generate a compensated I signal. The second mixer is configured to mix the multiband signal, the Q signal, and a second compensation value to generate a compensated Q signal. The mismatch compensation unit is configured to output the compensation values corresponding to a band of the multiband signal.

BRIEF DESCRIPTION OF THE DRAWINGS

The present inventive concept will become more apparent by describing in detail exemplary embodiments thereof with reference to the attached drawings in which.

DETAILED DESCRIPTION OF THE EXEMPLARY EMBODIMENTS

The present inventive concept now will be described more fully hereinafter with reference to the accompanying drawings, in which exemplary embodiments of the inventive concept are shown. This inventive concept may, however, be embodied in many different forms and should not be construed as limited to the embodiments set forth herein. In the drawings, like numbers refer to like elements throughout.

It will be understood that when an element is referred to as being "connected" or "coupled" to another element, it can be directly connected or coupled to the other element or intervening elements may be present.

Figure 1:
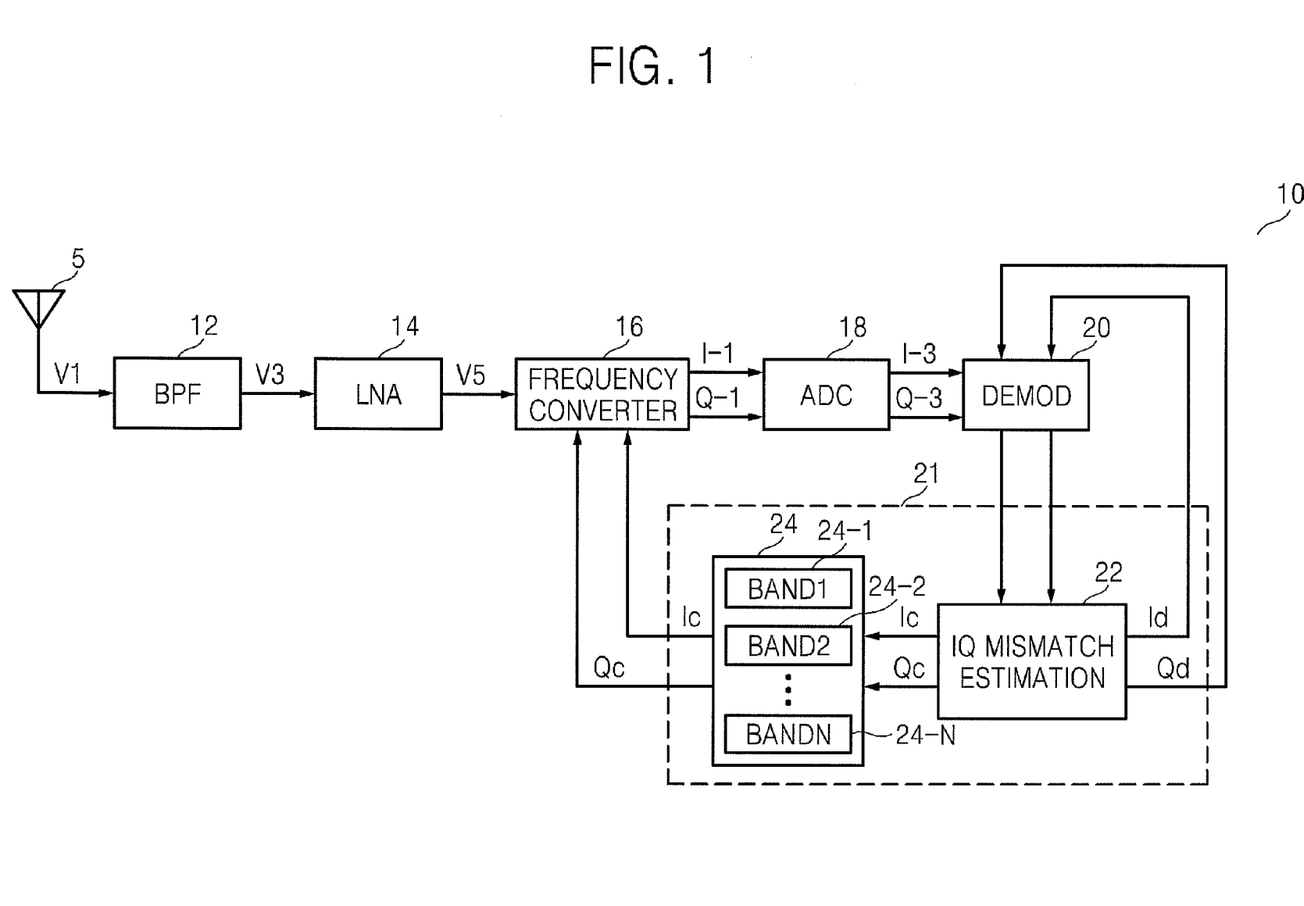
FIG. 1 is a block diagram of a receiver according to an exemplary embodiment of the present inventive concept.
Figure 2:
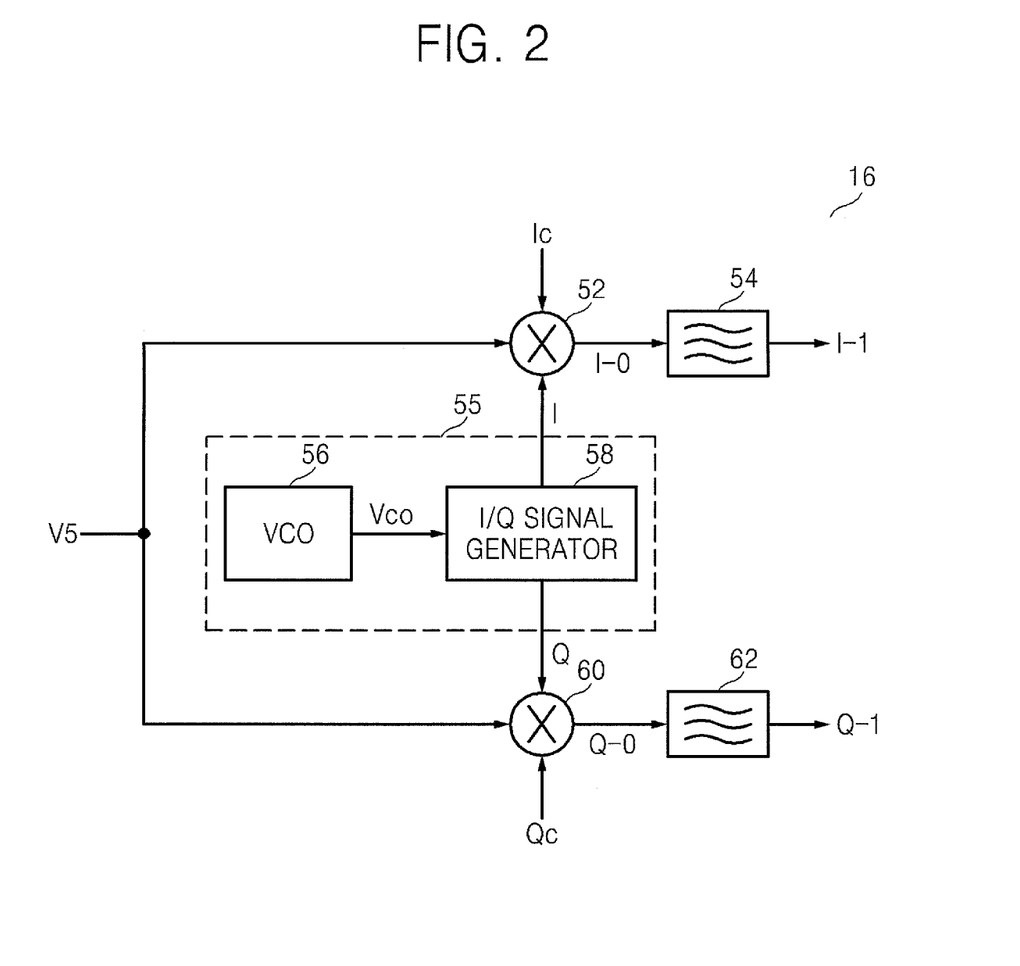
FIG. 2 is a block diagram of a frequency converter illustrated in FIG. 1 according to an exemplary embodiment of the present inventive concept.
Figure 3:
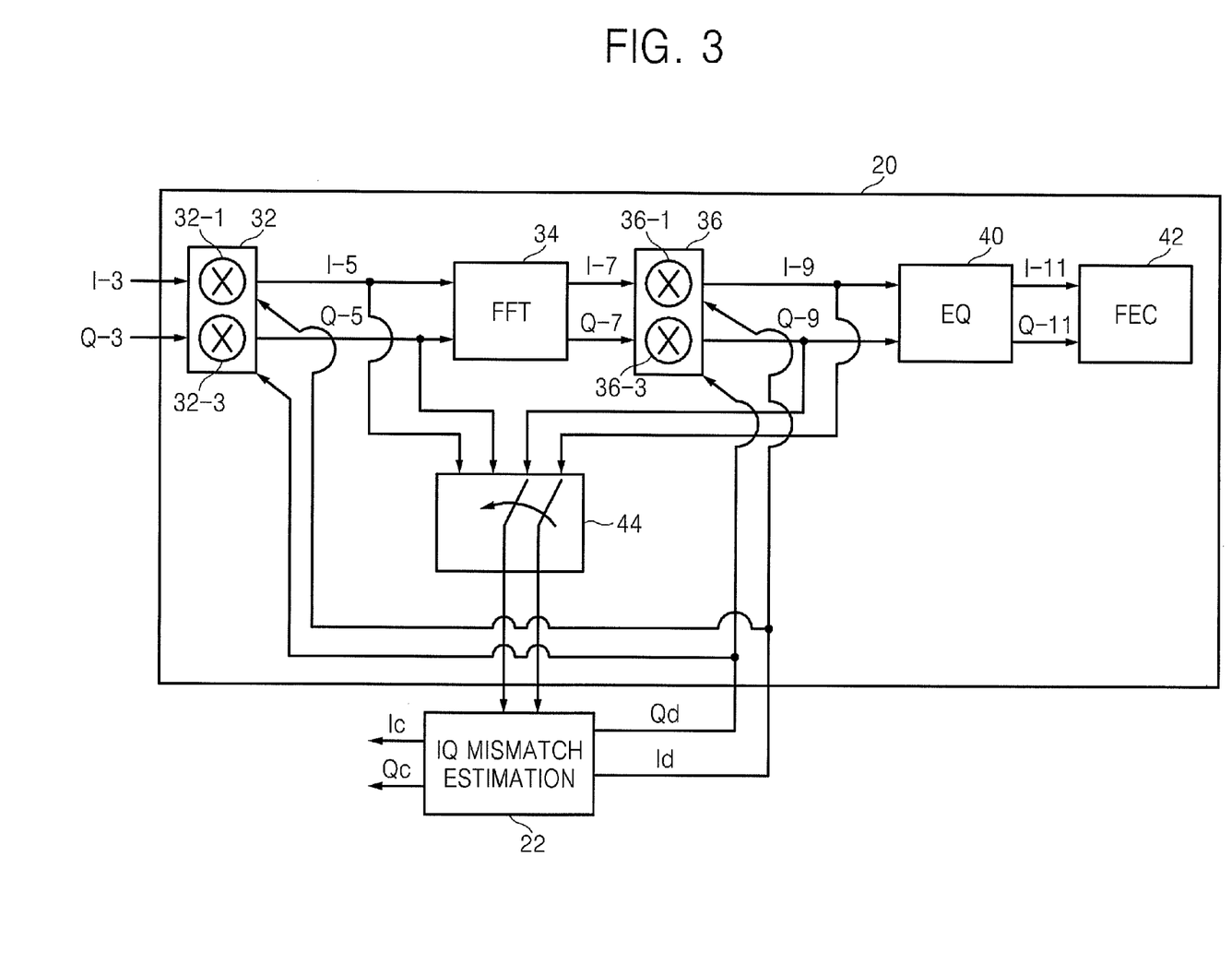
FIG. 3 is a block diagram of a demodulator illustrated in FIG. 1 according to an exemplary embodiment of the present inventive concept.

FIG. 1 is a block diagram of a receiver 10 according to an exemplary embodiment of the present inventive concept. FIG. 2 is a block diagram of a frequency converter 16 illustrated in FIG. 1 according to an exemplary embodiment of the present inventive concept. FIG. 3 is a block diagram of a demodulator 20 illustrated in FIG. 1 according to an exemplary embodiment of the present inventive concept. Referring to FIGS. 1 through 3, the receiver 10 may be used as an orthogonal frequency-division multiplexing (OFDM) receiver, a multiband OFDM receiver, or a direct conversion receiver. The receiver 10 includes an antenna 5, a band-pass filter (BPF) 12, a low-noise amplifier (LNA) 14, the frequency converter 16, an analog-to-digital converter (ADC) 18, the demodulator 20, and a mismatch compensator 21.

The BPF 12 receives a multiband signal V1 through the antenna 5 and filters the multiband signal V1 to pass frequencies only within a predetermined frequency range and reject frequencies outside that range. The multiband signal V1 is a signal having multiple frequency bands, and may be a signal used in, for example, Bluetooth or ultra-wideband (UWB). The BPF 12 may be omitted when the multiband signal V1 received by the antenna 5 only includes frequencies within the predetermined frequency range.

The LNA 14 receives a band-filtered multiband signal V3 from the BPF 12, low-noise amplifies the band-filtered multiband signal V3, and outputs a low-noise amplified multiband signal V5. The LNA 14 may be omitted when the received signal is not in need of amplification.

The frequency converter 16 receives the multiband signal V5 from the LNA 14 and generates an in-phase (I) signal I-1 and a quadrature-phase (Q) signal Q-1 based on the multiband signal V5. The frequency converter 16 also compensates for a mismatch in phase between the I signal I-1 and the Q signal Q-1 based on one or more compensation values, e.g., Ic and Qc, output from the mismatch compensator 21.

The I signal I-1 may be represented by Equation (1) as follows:

$$\hat{y}_i(t) = y_i(t), \quad (1)$$

wherein $\hat{y}_i(t)$ is the I signal I-1 after the compensation and $y_i(t)$ is the I signal I-1 before the compensation.

The Q signal Q-1 may be expressed by Equation (2) as follows:

$$\hat{y}_q(t) = (1+\epsilon)(y_q(t)\cos\theta - y_i(t)\sin\theta), \quad (2)$$

wherein $\hat{y}_q(t)$ is the Q signal Q-1 after the compensation, $y_q(t)$ is the Q signal Q-1 before the compensation, $\epsilon$ is a gain mismatch, and $\theta$ is a phase mismatch.

Ideally, the I signal I-1 and the Q signal Q-1 should have the same magnitude and a 90-degree phase difference therebetween. However, as is shown in Equations (1) and (2), the I signal I-1 and the Q signal Q-1 may have a mismatch, e.g., the gain mismatch $\epsilon$ and/or the phase mismatch $\theta$. The frequency converter 16 reads one or more compensation values Ic and Qc corresponding to each of multiple bands of the multiband signal V5 among compensation values stored for the multiple bands in advance in a compensation value storage unit 24 and compensates for the mismatch of the I signal I-1 and the Q signal Q-1 based on the compensation values Ic and Qc. The storage unit 24 may store compensation values for each band in parts 24-1, 24-2, ..., 24-N, where N is a natural number corresponding to a certain number of bands.

For example, when the multiband (e.g., an N-band signal, where N is a natural number) signal V5 is in a first band, the frequency converter 16 reads one or more compensation values Ic and Qc corresponding to the first band among the compensation values stored in the compensation value storage unit 24 with respect to the multiple bands and compensates for the mismatch of the I signal I-1 and the Q signal Q-1 based on the one or more compensation values Ic and Qc. The mismatch compensation causes the output signals (e.g., the I signal I-1 and the Q signal Q-1) of the frequency converter 16 to have the same or substantially the same magnitude and a 90-degree or substantially a 90-degree phase difference therebetween.

Referring to FIG. 2, the frequency converter 16 includes a first mixer 52, a signal generation unit 55, and a second mixer 60. The frequency converter 16 may further include a first filter 54 and a second filter 62. The first mixer 52 mixes the multiband signal V5 output from the LNA 14 and an I signal I output from the signal generation unit 55 and outputs a mixed signal I-0.

The first mixer 52 may compensate for the mismatch of the I signal I-0 based on a first compensation value (e.g., Ic) corresponding to a current band of the multiband signal V5. In this example, the first compensation value Ic input to the first mixer 52 is for compensating for the mismatch of the I signal I-0. Through the compensation, the mismatch of the I signal I-0 and a Q signal Q-0 can be compensated for.

For example, when the first compensation value Ic has a particular gain value (e.g., a constant value), the first mixer 52 may compensate for the gain mismatch of the I signal I-0 by multiplying the I signal I-0 by the first compensation value Ic. When the first compensation value Ic is a value (e.g., cos $\theta$ or sin $\theta$) including a particular phase, the first mixer 52 may compensate for the phase mismatch of the I signal I-0 by multiplying the I signal I-0 by the first compensation value Ic.

The first filter 54 receives and filters the I signal I-0 from the first mixer 52 and outputs a filtered signal I-1. The first filter 54 may be implemented by, for example, a low-pass filter (LPF).

The signal generation unit 55 generates the I signal I and a Q signal Q. The signal generation unit 55 includes a voltage-controlled oscillator (VCO) 56 and an I/Q signal generator 58. The VCO 56 generates a reference signal Vco and the I/Q signal generator 58 generates the I signal I and the Q signal Q in response to the reference signal Vco. In this example, the I signal I and the Q signal Q may have the same or substantially the same magnitude and a 90-degree or substantially a 90-degree phase difference therebetween.

The second mixer 60 mixes the multiband signal V5 output from the LNA 14 and the Q signal Q output from the signal generation unit 55 and outputs the mixed signal Q-0. The second mixer 60 may compensate for the mismatch of the Q signal Q-0 based on a second compensation value (e.g., Qc) corresponding to the current band of the multiband signal V5. In this example, the second compensation value Qc input to the second mixer 60 is for compensating for the mismatch of the Q signal Q-0. Through the compensation, the mismatch of the I signal I-0 and the Q signal Q-0 can be compensated for.

For example, when the second compensation value Qc has a particular gain value (e.g., a constant value), the second mixer 60 may compensate for the gain mismatch of the Q signal Q-0 by multiplying the Q signal Q-0 by the second compensation value Qc. When the second compensation value Qc is a value (e.g., cos $\theta$ or sin $\theta$) including a particular phase, the second mixer 60 may compensate for the phase mismatch of the Q signal Q-0 by multiplying the Q signal Q-0 by the second compensation value Qc.

The second filter 62 receives and filters the Q signal Q-0 from the second mixer 60 and outputs a filtered signal Q-1. The second filter 62 may be implemented by, for example, an LPF.

Referring to FIG. 1, the ADC 18 performs an analog-to-digital conversion of the I signal I-1 and the Q signal Q-1 output from the frequency converter 16 and outputs a digital I signal I-3 and a digital Q signal Q-3.

The demodulator 20 receives and demodulates the digital I signal I-3 and the digital Q signal Q-3. The demodulator 20 may compensate for the mismatch of the digital I signal I-3 and the digital Q signal Q-3 based on one or more digital compensation values (e.g., Id and Qd) output from the mismatch compensator 21 and perform demodulation based on a result of the compensation.

Referring to FIG. 3, the demodulator 20 may include a first compensator 32, a fast Fourier transform (FFT) block 34, a second compensator 36, an equalizer 40, a decoder 42, and a first selector 44. The first compensator 32 receives the digital I signal I-3 and the digital Q signal Q-3, performs mixing of the digital I signal I-3 and mixing of the digital Q signal Q-3 based on the one or more digital compensation values Id and Qd, and outputs mixed signals I-5 and Q-5 as compensated signals.

The first compensator 32 includes a first compensation mixer 32-1 and a second compensation mixer 32-3. The first compensation mixer 32-1 mixes the digital I signal I-3 and a third compensation value (or a third digital compensation value) Id output from a mismatch estimator 22 and outputs the mixed signal I-5 as a compensated signal. In this example, the third compensation value Id input to the first compensation mixer 32-1 is for compensating for the mismatch of the digital I signal I-3 and may be a value for compensating for a mismatch estimated by the mismatch estimator 22 based on the digital I signal I-5 and the digital Q signal Q-5.

For example, when the third compensation value Id has a particular gain value (e.g., a constant value), the first compensation mixer 32-1 may compensate for the gain mismatch of the digital I signal I-3 by multiplying the digital I signal I-3 by the third compensation value Id. When the third compensation value Id is a value (e.g., cos $\theta$ or sin $\theta$) including a particular phase, the first compensation mixer 32-1 may compensate for the phase mismatch of the digital I signal I-3 by multiplying the digital I signal I-3 by the third compensation value Id.

The second compensation mixer 32-3 mixes the digital Q signal Q-3 and a fourth compensation value (or a fourth digital compensation value) Qd output from the mismatch estimator 22 and outputs the mixed signal Q-5 as a compensated signal. In this example, the fourth compensation value Qd input to the second compensation mixer 32-3 is for compensating for the mismatch of the digital Q signal Q-3 and may be a value for compensating for a mismatch estimated by the mismatch estimator 22 based on the digital I signal I-5 and the digital Q signal Q-5.

For example, when the fourth compensation value Qd has a particular gain value (e.g., a constant value), the second compensation mixer 32-3 may compensate for the gain mismatch of the digital Q signal Q-3 by multiplying the digital Q signal Q-3 by the fourth compensation value Qd. When the fourth compensation value Qd is a value (e.g., cos θ or sine) including a particular phase, the second compensation mixer 32-3 may compensate for the phase mismatch of the digital Q signal Q-3 by multiplying the digital Q signal Q-3 by the fourth compensation value Qd.

The FFT block 34 receives the signals I-5 and Q-5 from the first compensator 32 and performs FFT on each of the signals I-5 and Q-5 respectively to generate a digital FFT I signal I-7 and a digital FFT Q signal Q-7.

The second compensator 36 may perform a mixing of the digital FFT I signal I-7 output from the FFT block 34 and a mixing of the digital FFT Q signal Q-7 output from the FFT block 34 based on the one or more digital compensation values (e.g., Id and Qd). The second compensator 36 includes a third compensation mixer 36-1 and a fourth compensation mixer 36-3.

The third compensation mixer 36-1 mixes the digital FFT I signal I-7 and the third compensation value Id output from the mismatch estimator 22 and outputs a mixed signal I-9 as a compensated signal. In this example, the third compensation value Id input to the third compensation mixer 36-1 is for compensating for the mismatch of the digital FFT I signal I-7 and may be a value for compensating for a mismatch estimated by the mismatch estimator 22 based on signals I-9 and Q-9 output from the second compensator 36.

For example, when the third compensation value Id has a particular gain value (e.g., a constant value), the third compensation mixer 36-1 may compensate for the gain mismatch of the digital FFT I signal I-7 by multiplying the digital FFT I signal I-7 by the third compensation value Id. When the third compensation value Id is a value (e.g., cos θ or sin θ) including a particular phase, the third compensation mixer 36-1 may compensate for the phase mismatch of the digital FFT I signal I-7 by multiplying the digital FFT I signal I-7 by the third compensation value Id.

The fourth compensation mixer 36-3 mixes the digital FFT Q signal Q-7 and the fourth compensation value Qd output from the mismatch estimator 22 and outputs the mixed signal Q-9 as a compensated signal. In this example, the fourth compensation value Qd input to the fourth compensation mixer 36-3 is for compensating for the mismatch of the digital FFT Q signal Q-7 and may be a value for compensating for the mismatch estimated by the mismatch estimator 22 based on the output signals I-9 and Q-9 of the second compensator 36.

For example, when the fourth compensation value Qd has a particular gain value (e.g., a constant value), the fourth compensation mixer 36-3 may compensate for the gain mismatch of the digital FFT Q signal Q-7 by multiplying the digital FFT Q signal Q-7 by the fourth compensation value Qd. When the fourth compensation value Qd is a value (e.g., cos θ or sin θ) including a particular phase, the fourth compensation mixer 36-3 may compensate for the phase mismatch of the digital FFT Q signal Q-7 by multiplying the digital FFT Q signal Q-7 by the fourth compensation value Qd.

The equalizer 40 equalizes each of the output signals I-9 and Q-9 of the second compensator 36 to generate equalized signals I-11 and Q-11. The decoder 42 decodes the equalized signals I-11 and Q-11 output from the equalizer 40. The decoder 42 may be implemented by, for example, a forward error correction (FEC) decoder.

The first selector 44 selectively transmits the output signals I-5 and Q-5 of the first compensator 32 or the output signals I-9 and Q-9 of the second compensator 36 to the mismatch estimator 22. For example, the first selector 44 may transmit the output signals I-5 and Q-5 of the first compensator 32 or the output signals I-9 and Q-9 of the second compensator 36 to the mismatch estimator 22 included in the mismatch compensator 21 (e.g., see FIG. 1) in response to a control signal (not shown). For example, the control signal may be generated by a central processing unit (CPU) (not shown).

Referring to FIG. 1, the mismatch compensator 21 may estimate the mismatch of the I signal I-1, I-3, I-5 I-7 or I-9 and the Q signal Q-1, Q-3, Q-5, Q-7 or Q-9 in each band of a multiband signal and store at least one compensation value, e.g., Ic, Qc, Id, or Qd used to compensate for the estimated mismatch. The mismatch compensator 21 may also update the compensation value Ic, Qc, Id, or Qd, which may vary with time with respect to each band and store an updated compensation value.

Alternatively, the mismatch compensator 21 may estimate the mismatch of the I signal I-1, I-3, I-5 I-7 or I-9 and the Q signal Q-1, Q-3, Q-5, Q-7 or Q-9 in each band of a multiband signal during a predetermined training period and store compensation values, e.g., Ic, Qc, Id, and Qd for each band. After the training period, the mismatch compensator 21 may transmit the compensation values Ic, Qc, Id, and Qd to the frequency converter 16 and/or the demodulator 20 according to a band of a signal input into the receiver 10.

The mismatch compensator 21 includes the mismatch estimator 22 and the compensation value storage unit 24. The mismatch estimator 22 estimates the mismatch of the I signal I-1, I-3, I-5 I-7 or I-9 and the Q signal Q-1, Q-3, Q-5, Q-7 or Q-9, which varies with the bands of the multiband signal (e.g., V5), and with respect to each band.

For example, the mismatch estimator 22 may determine whether the I signal I-1, I-3, I-5 I-7 or I-9 and the Q signal Q-1, Q-3, Q-5, Q-7 or Q-9 have the same magnitude in each band of the multiband signal V5 and detect a mismatch estimate value (e.g., a magnitude mismatch) based on a result of the determination. In addition, the mismatch estimator 22 may determine whether the I signal I-1, I-3, I-5 I-7 or I-9 and the Q signal Q-1, Q-3, Q-5, Q-7 or Q-9 have a 90-degree phase difference in each band of the multiband signal V5 and detect a mismatch estimate value (e.g., a phase mismatch) based on a result of the determination.

The mismatch estimator 22 may generate the compensation values (e.g., Ic, Id, Qc, and Qd) for compensating for the mismatch (e.g., the magnitude mismatch or the phase mismatch) based on the mismatch estimate value.

The compensation value storage unit 24 may store at least one compensation value Ic or Qc generated by the mismatch estimator 22 for each band. The at least one compensation value Ic or Qc may be stored in a form of look-up table (LUT). The LUT may be indexed (e.g., accessed) by the particular band of the multiband signal V5.

Figure 4:
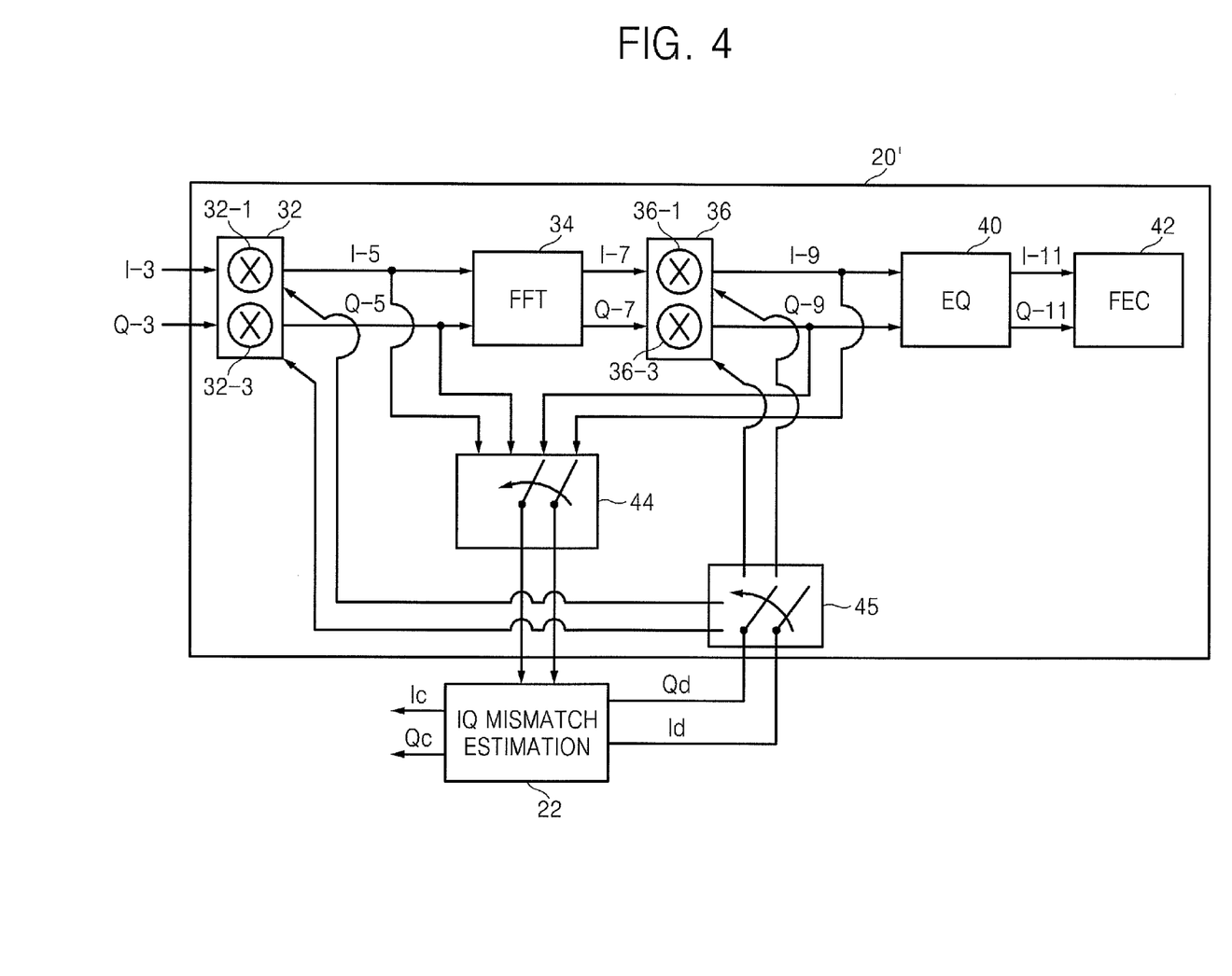
FIG. 4 is a block diagram of a demodulator illustrated in FIG. 1 according to an exemplary embodiment of the present inventive concept.

FIG. 4 is a block diagram of a demodulator 20' according to an exemplary embodiment of the present inventive concept that can be used in place of the demodulator 20 of FIG. 3. Referring to FIGS. 3 and 4, the demodulator 20' illustrated in FIG. 4 may further include a second selector 45 as compared to the demodulator 20 illustrated in FIG. 3. The second selector 45 may transmit the digital compensation values Id and Qd generated by the mismatch estimator 22 to the first compensator 32 or the second compensator 36. For example, the second selector 45 may transmit the digital compensation values Id and Qd generated by the mismatch estimator 22 to the first compensator 32 or the second compensator 36 in response to a control signal (not shown). The control signal may be output from a CPU (not shown).

The signals I-5 and Q-5 obtained after the compensation by the first compensator 32 may be time-domain signals, which have not undergone the FFT by the FFT block 34. The signals I-9 and Q-9 obtained after the compensation by the second compensator 36 may be frequency-domain signals, which have undergone the FFT by the FFT block 34.

When the digital compensation values Id and Qd generated by the mismatch estimator 22 are related by a time domain, the second selector 45 may transmit the digital compensation values Id and Qd to the first compensator 32. When the digital compensation values Id and Qd generated by the mismatch estimator 22 are related by a frequency domain, the second selector 45 may transmit the digital compensation values Id and Qd to the second compensator 36.

For example, the demodulator 20' of the receiver 10 adaptively compensates for the mismatch of the I signal I-5 or I-9 and the Q signal Q-5 or Q-9 according to the characteristic of the digital compensation values Id and Qd, for example, depending on whether the digital compensation values Id and Qd are related by the time domain or the frequency domain.

Figure 5:
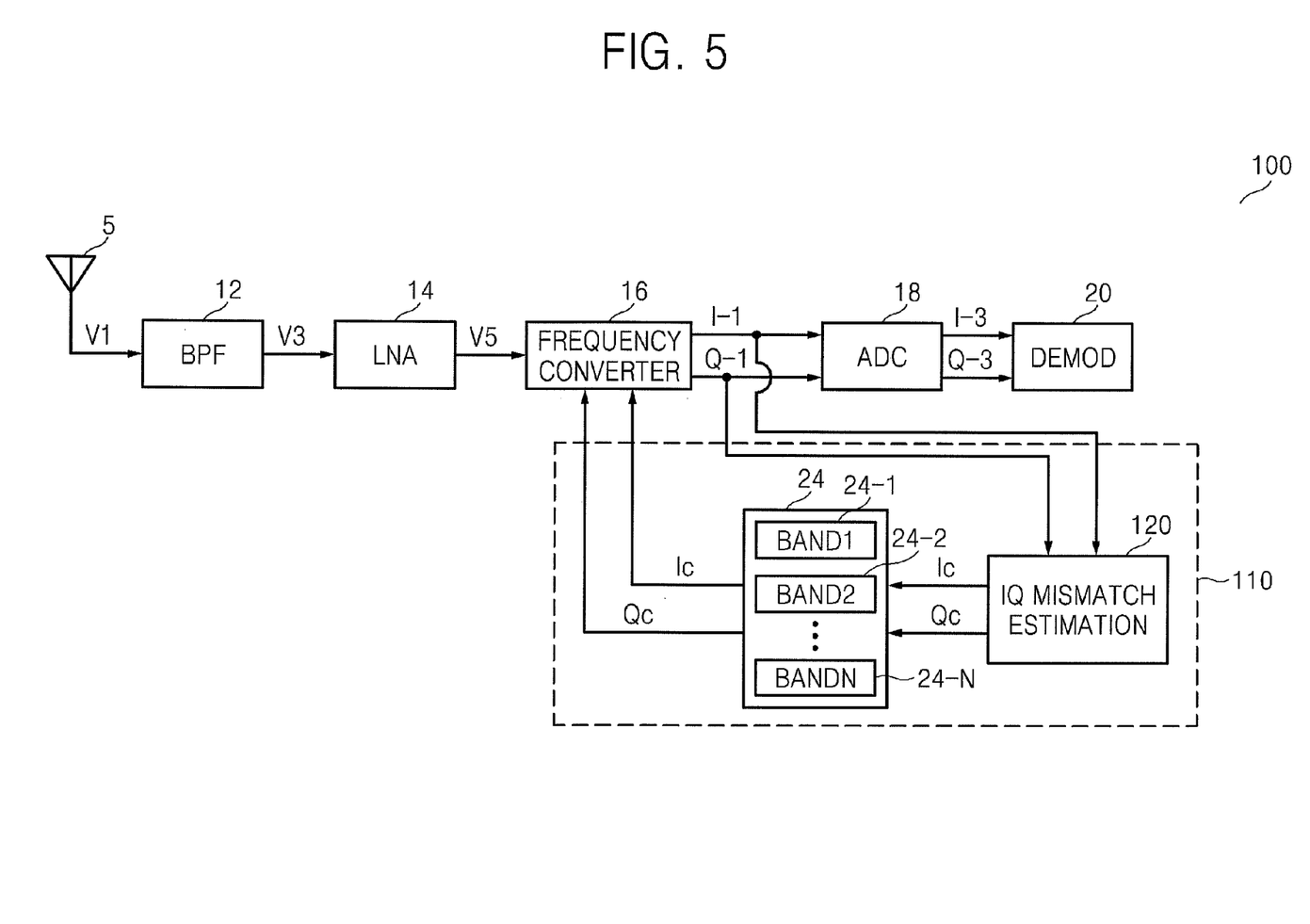
FIG. 5 is a block diagram of a receiver according to an exemplary embodiment of the present inventive concept.

FIG. 5 is a block diagram of a receiver 100 according to an exemplary embodiment of the present inventive concept. Referring to FIGS. 1 and 5, the receiver 100 illustrated in FIG. 5 is different from the receiver 10 illustrated in FIG. 1 in that a mismatch compensator 110 included in the receiver 100 receives the I signal I-1 and the Q signal Q-1 output from the frequency converter 16 and estimates the mismatch of the I signal I-1 and the Q signal Q-1. The mismatch compensator 110 estimates the mismatch of the analog I signal I-1 and the analog Q signal Q-1.

For example, the mismatch compensator 110 may determine whether the I signal I-1 and the Q signal Q-1 have the same magnitude in each of the bands of a multiband signal and detect a mismatch estimate value (e.g., a magnitude mismatch) based on a result of determination. In addition, the mismatch compensator 110 may determine whether the I signal I-1 and the Q signal Q-1 have a 90-degree phase difference in each band of the multiband signal and detect a mismatch estimate value (e.g., a phase mismatch) based on a result of the determination.

The mismatch compensator 110 may generate the compensation value Ic and Qc for compensating for the mismatch (e.g., the magnitude mismatch or the phase mismatch) based on the mismatch estimate value.

The mismatch compensator 110 includes a mismatch estimator 120 and the compensation value storage unit 24. The mismatch estimator 120 may estimate the mismatch of the I signal I-1 and the Q signal Q-1 in each band of the multiband signal and generate the compensation values Ic and Qc for compensating for the estimated mismatch. The compensation value storage unit 24 may store the compensation values Ic and Qc generated by the mismatch estimator 120 for each band of the multiband signal. The compensation values Ic and Qc may be stored in a form of a LUT.

Figure 6:
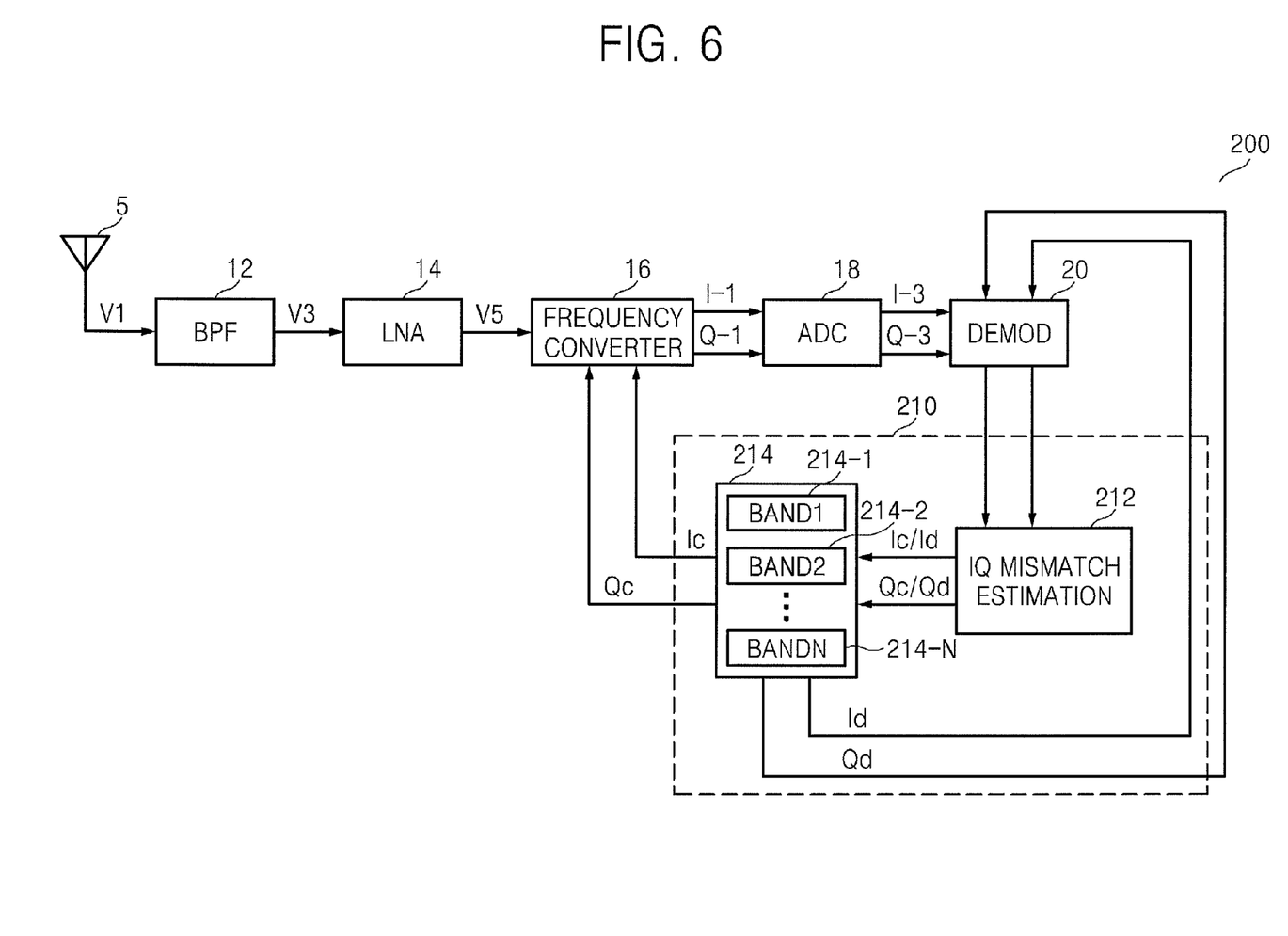
FIG. 6 is a block diagram of a receiver according to an exemplary embodiment of the present inventive concept.

FIG. 6 is a block diagram of a receiver 200 according to an exemplary embodiment of the present inventive concept. Referring to FIGS. 1, 3, and 6, a mismatch compensator 210 included in the receiver 200 illustrated in FIG. 6 is different from the mismatch compensator 21 of the receiver 10 illustrated in FIG. 1 in that the mismatch compensator 210 stores one or more digital compensation values (e.g., Id and Qd) for each of the bands of the I signals I-3, I-5, I-7, and I-9 and the Q signals Q-3, Q-5, Q-7, and Q-9 in advance and outputs one or more digital compensation values (e.g., Id and Qd), which correspond to the band of the I signal I-3, I-5, I-7, or I-9 and the Q signal Q-3, Q-5, Q-7, or Q-9 input thereto, to the demodulator 20.

The mismatch compensator 210 includes a mismatch estimator 212 and a compensation value storage unit 214. The storage unit 214 may store compensation values for each band in parts 214-1, 214-2, ..., 24-N, where N is a natural number corresponding to a certain number of bands.

The mismatch estimator 212 may estimate the mismatch of the I signal I-3, I-5, I-7, or I-9 and the Q signal Q-3, Q-5, Q-7, or Q-9 and generate at least one compensation value Ic, Qc, Id, or Qd for compensating for the estimated mismatch.

The compensation value storage unit 214 may store one or more compensation values Ic, Qc, Id, and Qd generated by the mismatch compensator 210 and may output at least one compensation value Ic, Qc, Id, or Qd corresponding to a current band in response to a control signal (not shown) of a CPU (not shown) to the frequency converter 16 or the demodulator 20. For example, the compensation value storage unit 214 may output at least one compensation value Ic or Qc to the frequency converter 16 in response to a control signal (not shown) of the CPU and may output at least one compensation value Id or Qd to the demodulator 20 in response to a control signal (not shown) of the CPU. The compensation value storage unit 214 may store the compensation values Ic, Qc, Id, and Qd generated by the mismatch estimator 212 by bands in a form of a LUT.

Figure 7:
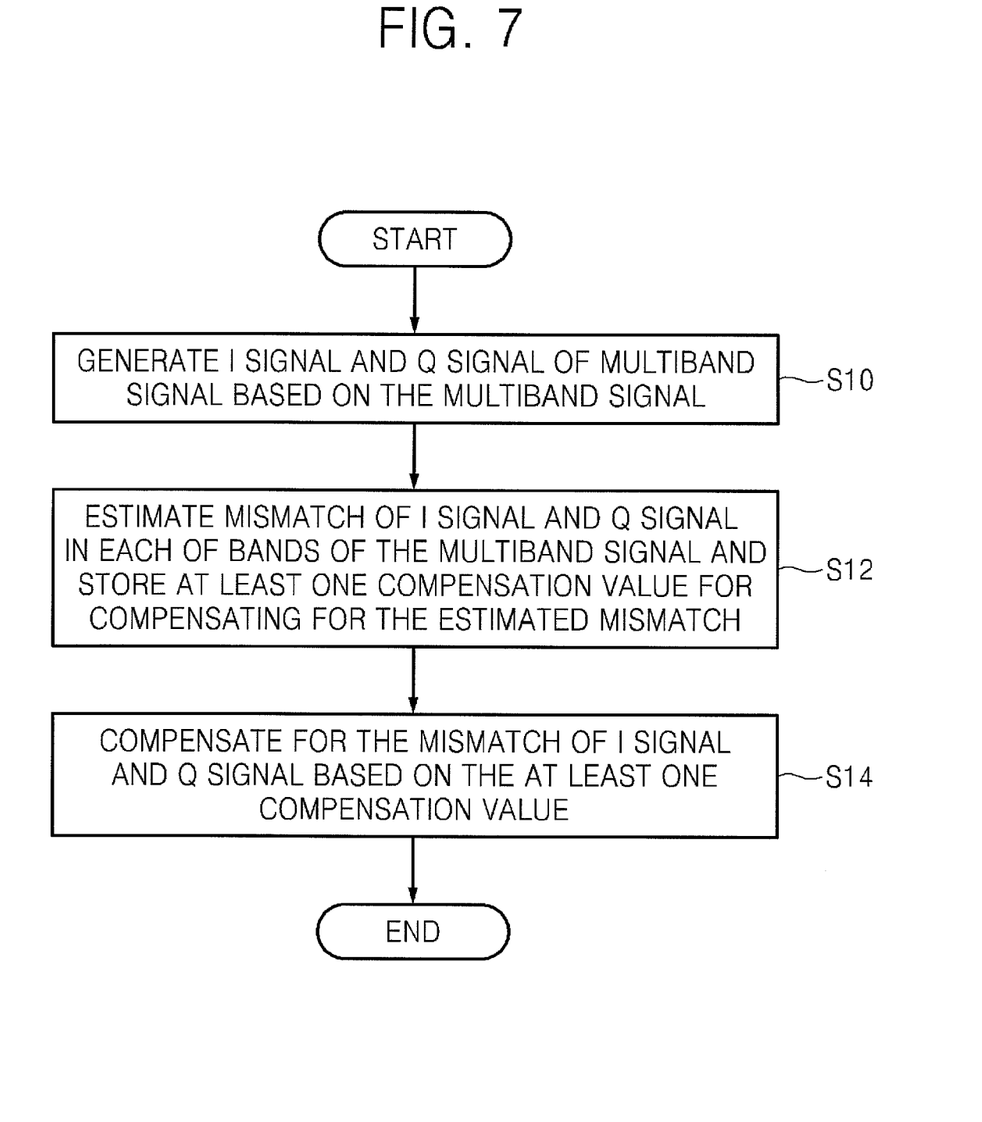
FIG. 7 is a flowchart of a method of compensating for mismatch according to an exemplary embodiment of the present inventive concept.

FIG. 7 is a flowchart of a method of compensating for mismatch according to an exemplary embodiment of the present inventive concept. Referring to FIGS. 1 and 7, the frequency converter 16 generates the I signal I-1 and the Q signal Q-1 of the multiband signal V5 in operation S10. The mismatch compensator 21 estimates the mismatch of the I signal I-1 and the Q signal Q-1 in each of the bands of the multiband signal V5 and stores at least one compensation value Ic or Qc for compensating for the mismatch in operation S12. The frequency converter 16 compensates for the mismatch of the I signal I-1 and the Q signal Q-1 based on the at least one compensation value Ic or Qc in operation S14.

The receivers 10, 100, or 200 illustrated in FIG. 1, 5, or 6, respectively, may be implemented in a communication system (not shown). The communication system may be any wireless system such as a portable terminal, a personal digital assistant (PDA), a portable computer, a wireless telephone, a satellite system, a pager, a radio frequency identification (RFID) reader, or RFID system. The communication system may also be a wireless local area network (WLAN) system or a wireless personal area network (WPAN) system.

As described above, according to at least one exemplary embodiment of the present inventive concept, a receiver and a communication system including the same can compensate for the mismatch of an I signal and a Q signal. In addition, the receiver and the communication system can effectively compensate for the mismatch of an I signal and a Q signal of a multiband signal.

While the present inventive concept has been particularly shown and described with reference to exemplary embodiments thereof, it will be understood by those of ordinary skill in the art that various changes in forms and details may be made therein without departing from the spirit and scope of the disclosure.

What is claimed is:
1. A receiver comprising:
a frequency converter configured to generate an in-phase (I) signal and a quadrature-phase (Q) signal from each band of a multiband signal;

a mismatch compensator configured to estimate a mismatch between the I signal and the Q signal for each of the bands of the multiband signal and store at least one compensation value to compensate for the estimated mismatch;

an analog-to-digital converter configured to perform analog-to-digital conversion on the I signal and the Q signal and to output a digital I signal and a digital Q signal; and a demodulator configured to receive the digital I signal and the digital Q signal and to perform demodulation on each of the digital I and Q signals to generate a corresponding demodulated digital I signal and a demodulated digital Q signal, wherein the frequency converter is further configured to compensate for the mismatch between the I signal and the Q signal based on the at least one compensation value, and wherein the demodulator comprises a fast Fourier transform (FFT) block configured to perform a FFT on the digital I signal mixed with one of the compensation values and to perform a FFT on the digital Q signal mixed with another one of the compensation values.

2. The receiver of claim 1, wherein the mismatch compensator is configured to estimate a mismatch between each demodulated digital I signal and each demodulated digital Q signal for each of the bands and store at least one digital compensation value to compensate for the estimated mismatch, and the demodulator is configured to compensate for the mismatch between the digital signal and the digital Q signal based on the at least one digital compensation value output from the mismatch compensator and perform the demodulation based on a result of the compensation.

3. The receiver of claim 2, wherein the at least one compensation value or the at least one digital compensation value is one of a phase mismatch compensation value and a magnitude mismatch compensation value.

4. The receiver of claim 2, wherein the demodulator comprises:

a first mixer configured to receive the digital I signal and the digital Q signal and perform mixing of the digital I signal and mixing of the digital Q signal based on the at least one digital compensation value;

the fast Fourier transform (FFT) block configured to perform FFT of signals output from the first mixer to generate FFT signals;

an equalizer configured to perform equalization of each of the FFT signals output from the FFT block to generate equalized signals; and a decoder configured to decode the equalized signals output from the equalizer.

5. The receiver of claim 4, wherein the demodulator further comprises a second mixer electrically connected between the FFT block and the equalizer to perform mixing of each of the FFT signals output from the FFT block based on the at least one digital compensation value.

6. The receiver of claim 5, wherein the demodulator further comprises a selector configured to selectively transmit signals output from the first mixer or signals output from the second mixer to the mismatch compensator, wherein the mismatch compensator is configured to estimate a mismatch of signals output from the first mixer or signals output from the second mixer and store the at least one digital compensation value based on a result of the estimation.

7. The receiver of claim 1, wherein the mismatch compensator comprises:

a mismatch estimator configured to estimate the mismatch of the pre-compensated I signal and the pre-compensated Q signal and to generate the at least one compensation value for compensating for the estimated mismatch; and a compensation value storage unit configured to store the at least one compensation value, generated by the mismatch estimator, for each of the bands.

8. The receiver of claim 7, wherein the frequency converter is configured to read at least one compensation value corresponding to each band of the multiband signal from the compensation value storage unit and compensate for the mismatch of the pre-compensated I signal and the pre-compensated Q signal based on the at least one compensation value.

9. A receiver comprising:

an antenna configured to receive a multiband signal having at least two distinct frequency bands;

a low band pass filter configured to reject frequencies from at least one of the two distinct frequency bands to generate a band passed signal;

a low-noise amplifier configured to amplify the band passed signal to generate an output signal;

a voltage-controlled oscillator configured to generate a reference signal;

a signal generator configured to generate an in-phase signal and a quadrature-phase signal in response to the reference signal;

a first mixer configured to mix the output signal, the in-phase signal, and a first compensation value to generate a compensated in-phase signal;

a second mixer configured to mix the output signal, the quadrature-phase signal, and a second compensation value to generate a compensated quadrature-phase signal;

an analog to digital converter configured to generate a digital in-phase signal from the compensated in-phase signal and a digital quadrature-phase signal from the compensated quadrature-phase signal;

a third mixer configured to mix the digital in-phase signal with a third compensation value to generate a compensated digital in-phase signal;

a fourth mixer configured to mix the digital quadrature-phase signal with a fourth compensation value to generate a compensated digital quadrature-phase signal;

logic to compute a Fast Fourier Transform (FFT) on the compensated digital in-phase signal and the compensated digital quadrature-phase signal to respectively generate a corresponding FFT digital in-phase signal and a FFT digital quadrature-phase signal;

a fifth mixer configured to mix the FFT digital in-phase signal with the third compensation value to generate a compensated FFT digital in-phase signal;

a sixth mixer configured to mix the FFT digital quadrature-phase signal with the fourth compensation value to generate a compensated FFT digital quadrature-phase signal; and a mismatch compensation unit configured to estimate a mismatch in magnitude and phase between the compensated digital in-phase signal and the compensated digital quadrature-phase signal and a mismatch in magnitude and phase between the compensated FFT digital in-phase signal and the compensated FFT digital quadrature-phase signal to generate all of the compensation values.

10. The receiver of claim 9, further comprising:
an equalizer configured to perform equalization of each of the compensated FFT signals to generate equalized signals; and
a forward error correction decoder configured to decode the equalized signals output from the equalizer.

11. A communication system comprising:
a receiver configured to compensate for a mismatch between an in-phase (I) signal and a quadrature-phase (Q) signal, the receiver comprising:
an antenna configured to receive a multiband signal;
a voltage-controlled oscillator configured to generate a reference signal that is distinct from the multiband signal;
a signal generator configured to generate the I signal and the Q signal from the reference signal;
a first mixer configured to mix the multiband signal, the I signal, and a first compensation value to generate a compensated I signal;
a second mixer configured to mix the multiband signal, the Q signal, and a second compensation value to generate a compensated Q signal; and
a mismatch compensation unit configured to output the compensation values corresponding to a band of the multiband signal.

12. The communication system of claim 11, further comprising a look up table (LUT) including the compensation values an indexed by the frequency of the band of the multiband signal.

13. The communication system of claim 11, wherein the multiband signal is one of a Bluetooth or ultra-wideband signal.

14. The communication system of claim 11, further comprising:
a first low pass filter configured to filter the compensated I signal; and
a second low pass filter configured to filter the compensated Q signal.

15. The communication system of claim 11, further comprising:
an analog to digital converter configured to convert the compensated I and Q signals to digital I and Q signals; and
a demodulator configured to demodulate the digital I and Q signals.

16. The communication system of claim 15, wherein the demodulator comprises:
a third mixer configured to mix the digital I signal with a third compensation value to generate a compensated digital I signal;
a fourth mixer configured to mix the digital Q signal with a fourth compensation value to generate a compensated digital Q signal;
logic to compute a Fast Fourier Transform (FFT) on the compensated digital I signal and the compensated digital Q signal to respectively generate a corresponding FFT digital I signal and a FFT digital Q signal;
a fifth mixer configured to mix the FFT digital I signal with the third compensation value to generate a compensated FFT digital I signal;
a sixth mixer configured to mix the FFT digital Q signal with the fourth compensation value to generate a compensated FFT digital Q signal; and
a mismatch estimation unit configured to estimate a mismatch between the compensated digital I signal and the compensated digital Q signal and a mismatch between the compensated FFT digital I signal and the compensated FFT digital Q signal to generate all of the compensation values.

17. The communication system of claim 16, the demodulator further comprising:
a first selector to channel one of (i) the compensated digital I signal and the compensated digital Q signal or (ii) the compensated FFT digital I signal and the compensated FFT digital Q signal, to the mismatch estimation unit.

18. The communication system of claim 16, the demodulator further comprising:
a second selector to channel the third and fourth compensation values respectively from the mismatch estimation unit to one of (i) the third and fourth mixers or (ii) the fifth and sixth mixers.

19. The communication system of claim 11, wherein each compensation value is at least one of a phase mismatch compensation value and a magnitude mismatch compensation value.

* * * * *